United States Patent Office 2,715,067
Patented Aug. 9, 1955

2,715,067
FODDER FOR RUMINANTS
Jonas Kamlet, Easton, Conn.

No Drawing. Application Aug. 19, 1953,
Serial No. 375,298

3 Claims. (Cl. 99—2)

This invention relates to a new fodder for ruminants. More particularly, it relates to a new fodder component which may be added to the feed of domestic ruminants and which efficiently and cheaply serves to replace part or all of the dry roughage, green roughage and silage normally incorporated into such feeds.

For a considerable time in the past, animal feeding stuffs have been divided by analysis into six components—moisture, ether extract, protein, ash, crude fiber and nitrogen-free extract. The crude fiber was usually the measure of the poorly digested fibrous material in the feed. However, ample evidence has accumulated from the work of many experimenters that the crude fiber of forages may be as well digested as added carbohydrate or protein. The proportion of the cellulosic or crude fiber content of each type of dry roughage, green roughage and silage which is actually digested by the ruminant represents a much truer index of its suitability for use in commercial animal feeds by feed lot operators, sheep raisers, farmers and others engaged in the raising of meat animals for the market. Thus, by measuring the cellulosic content of the feed and the cellulose content of feces of test animals fed therewith, the percentage of digestibility of the roughage or silage may be determined (Crampton and Maynard, Journal of Nutrition, 15, #4, 383–395 (1938); Heller and Wall, Journal of Nutrition, 19, 141–149 (1940)).

Thus, the cellulose contents of such roughages and silages as timothy hay, alfalfa hay, wheat straw, Bermuda grass, alfalfa leaf meal, soy bean hay, sorgo, yellow milo and millet hay have been found to be from 50% to 65% digestible. This includes the hemicellulose contents of the roughages and silages as well. Biologically, the hemicelluloses are degraded and assimilated during metabolism in the same fashion as are the celluloses proper. The lignin content of these roughages and silages is almost completely unassimilated and is recovered almost quantitatively in the feces of the animal.

The basis of this invention is the finding that waste newsprint is an excellent, inexpensive, highly digestible substitute for the cellulose-containing green roughages, dry roughages and silages, and may be used as partial or total replacement for such roughages and silages in animal fodders.

Newsprint as manufactured throughout the world consists of about 10% of mineral loading and sizing, and 90% of a mixture of 70%–80% mechanical pulp and 20%–30% unbleached sulfite pulp. The mechanical pulp is made by the comminution of softwood averaging 25% lignin, 25% hemicelluloses and 50% cellulose. The sulfite pulp is made by the cooking of softwood chips with a reagent, such as calcium-, ammonium- or magnesium bisulfite solution, followed by a filtration of the high alpha-cellulose containing residue. Thus, the sulfite pulp portion of the newsprint averages 90% of alpha-cellulose and 10% hemicelluloses and other forms of cellulose. Newsprint therefore averages 10.0% of mineral loading and sizing
18.8%–18.0% of lignin
18.5%–19.8% of hemicelluloses ⎫ 70.7%–75.6% of
52.2%–55.8% of cellulose ⎭ total celluloses In the process of making the newsprint, the comminuted woodpulp and sulfite pulp are agitated for several hours in a beater. This beating process serves to hydrate the cellulose molecule and to loosen its bond with the lignin. It also serves to render the cellulose molecule much more susceptible to chemical, bacteriological and enzymatic attack. Thus, the hydrated, largely delignified cellulose in newsprint is much more readily attacked and digested in the alimentary system of herbivorous ruminants than is cellulose in the form of conventional roughages and silages.

The mineral loading in newsprint is usually chosen from the group consisting of kaolin (china clay), pearl hardening (calcium sulfate), agalite (magnesium silicate), chalk, precipitated calcium carbonate and barium sulfate. The sizing materials, added much less frequently, are chosen from the group consisting of gelatin, rosin, alum, casein, starch and sodium silicate. All of these substances are completely innocuous in animal feeds, in the proportions and amounts normally present in waste newsprint. No toxic or undesirable laxative action is noted following the ingestion by test animals of feeds containing waste newsprint containing 10% of such mineral loading and sizing, the feed being available to the animal without restriction, for prolonged periods of time.

Similarly, the ink used in printing newspapers, consisting largely of carbon black suspended in various organic solvents, is present in such slight amounts by actual weight, in the waste newsprint that it has no adverse effect whatever on the assimilability, palatability, and digestibility of the waste newsprint in the fodder. The solvent has long since evaporated or dissipated by the time the printed newspaper has become waste newsprint.

The collection and utilization of waste newsprint is a large industry in the United States and abroad. Almost ten million tons of newsprint and other waste papers are used annually in the United States in the manufacture of paper board, and that represents only a portion of the waste paper available from urban and metropolitan areas in the United States and abroad. Often the waste newsprint, as collected, is admixed with considerable amounts of waste kraft paper. Kraft paper is made by the almost complete delignification of various softwoods with alkaline reagents, and is usually used for paper bags, wrappers, shopping baskets, cartons, shipping and mailing papers and wherever high mechanical strength is desired. It is customary at the present time to incorporate up to five percent of various resins in the kraft paper (e. g., urea-formaldehyde, melamine - formaldehyde, glyoxal - urea - formaldehyde resins) to impart high wet-strength to the paper. I have found that the presence of up to 50% of kraft paper in the waste newsprint has no appreciable effect on the palatability, assimilability and digestibility of the mixture. The high wet-strength resins seem to be inert in the digestive tract of the ruminant and no deleterious effect has been noted due to the presence of kraft paper containing high wet-strength resins admixed with the waste newsprint fed to experimental animals.

I am aware that it has long been known that cellulose (such as, for instance, purified sulfite pulp), can be added to the diets of ruminant animals (Meld. Norges Landbrukshøgsk, 1945, 25, Nos. 3–4, 210–252; Hansa-Muhle, German Patent 735,037 (1943), also German Patents 130,102; 131,022; 135,578; 143,368; 301,207; 304,331; 322,918; 505,738; 677,997 and 744,656; Grant, Industrial Chemist, September 1942, pp. 24–329. However, it has never previously been shown that waste newsprint (by virtue of the hydration and partial delignification of the cellulose contained therein), can be used as a source of the cellulose commonly supplied by the roughages and silages in the animal fodder. The advantages resident in the use of waste newsprint in place of the purified sulfite pulp are obvious. Thus, when sulfite pulp was selling at $120. a ton and was in short supply, waste newsprint was freely available in many metropolitan areas in the United States, at prices ranging from $8. to $15. a ton.

The waste newsprint, commonly received in bales, is preferably comminuted by being cut into ribbons or shreds or being chopped into confetti or a fine pulp. It may be fed to the animals in any convenient form, dry or wet. Because of the higher water absorbency of waste newsprint, it may be made into a slurry or pulp with water and fed to the animals in that form.

I have found that the palatability of the waste newsprint is largely increased by admixing it with molasses, or a similar source of carbohydrate. The use of molasses as a feed ingredient is fast becoming standard practice in the cattle raising industry (Hawaiian Planters' Record, 40, #2, 121–125 (1936), ibid. 42, #1, 77–96 (1938); "Marketing of Feed Molasses" by Kutish (U. S. Dept. Agriculture (1950); "Hydrolysis of Wood for Stock Feed"—R1731, U. S. Dept. Agriculture, Forest Products Laboratory); "Increasing the Use of Feed Molasses," Aries and Copulsky). The molasses may be derived from the processing of cane sugar (blackstrap or invert molasses), beet sugar (beet molasses), corn (hydrol or similar by-products of glucose manufacture), citrus molasses or may be derived by the hydrolysis of wood chips and sawdust. Ammoniated molasses, recently introduced by the Commercial Solvents Corporation, may also be admixed with the waste newsprint to increase its palatability. I prefer to dilute the molasses with water and admix it with the shredded newsprint until a uniform paste or pulp is obtained. This may be fed directly to the animals, or it may be shaped into cakes or blocks, and dried for shipping and storage.

In order to test the relative assimilability and percent of digestibility, a basic ration of 25% molasses, 50% alfalfa and 25% of corn was fed to yearling steers, and to sheep. The alfalfa was then partially and totally substituted, in various degrees, by waste newsprint. The cellulose content of the feed and of the feces was determined by the method of Crampton and Maynard (cited above).

With six head of cattle, fed 20 lbs. (dry weight) each of the basic ration daily, the following results were obtained:

Average weight of feces_____lbs__ 4.06
Average content of cellulose in ration_____lbs__ 2.685
Average content of cellulose in feces_____lbs__ 1.388
Digestibility of cellulose in ration____percent__ 48

Modifying the above basic ration by substituting waste newsprint for one-third of the alfalfa, the following results were obtained:

Average weight of feces_____lbs__ 3.94
Average cellulose content in ration_____lbs__ 4.305
Average weight of cellulose in feces_____lbs__ 1.666
Digestibility of cellulose in ration_____percent__ 61

Modifying the above basic ration by substituting waste newsprint for two-thirds of the alfalfa, the following results were obtained:

Average weight of feces_____lbs__ 4.20
Average cellulose content in ration_____lbs__ 5.365
Average weight of cellulose in feces_____lbs__ 1.892
Digestibility of cellulose in ration_____percent__ 65

Modifying the above basic ration by substituting waste newsprint for all of the alfalfa, the following results were obtained:

Average weight of feces_____lbs__ 4.29
Average cellulose content in ration_____lbs__ 7.535
Average weight of cellulose in feces_____lbs__ 2.492
Digestibility of cellulose in ration_____percent__ 69

(N. B. In all cases, the figure for cellulose represented the total of cellulose and hemicelluloses.)

It was also noted that kraft paper admixed with the waste newsprint up to about 50% by weight, did not affect the percentage digestibility of the cellulose in the ration, but kraft paper present in excess of 50% lowered the percentage of digestibility of cellulose in the ration. Thus 75% of kraft in the ration lowered the percent digestibility of cellulose in the ration to 45%.

Thus, it may be seen that cellulose in the form of alfalfa is only 48% digestible by cattle, whereas cellulose in the form of waste newsprint is 69% digestible by cattle.

Similarly, with six head of sheep, fed on the above basic and modified ration, the percentage of cellulose in the ration found to be digestible was:

Percent
All alfalfa_____ 51
One-third alfalfa, two-thirds waste newsprint_____ 58
Two-thirds alfalfa, one-third waste newsprint_____ 65
All waste newsprint_____ 71

It may therefore be taken that the cellulose content of waste newsprint is digestible to the extent of about 70% by ruminant herbivora. Since waste newsprint contains about 75% of total cellulose (and hemicelluloses), the average assimilable carbohydrate content of waste newsprint is slightly higher than 50%. Thus, on a weight-for-weight basis, waste newsprint is equivalent to blackstrap molasses (50% carbohydrate content) in digestibility and food value.

In order to compare the use of waste newsprint with green and dry roughages in fattening yearling steers, four steers were fed on each of the following three diets for 6–7 months. The results obtained were as follows:

| | Ration A | Ration B | Ration C |
|---|---|---|---|
| Average daily feed: | Pounds | Pounds | Pounds |
| Hay | 2.50 | 2.50 | |
| Straw | 2.50 | | |
| Shelled Corn | 15.00 | 15.00 | 15.00 |
| Soybean Cake | 1.50 | 1.50 | 1.50 |
| Molasses | 1.00 | 1.00 | 1.00 |
| Mineral Mixture | .06 | .06 | .06 |
| Block Salt | .02 | .02 | .02 |
| Waste newsprint | | 2.50 | 5.00 |
| Average initial weight | 810 | 818 | 840 |
| Weight after 200 days | 1,292 | 1,326 | 1,350 |
| Average daily gain | 2.41 | 2.54 | 2.55 |

I have thus found that waste newsprint (which may contain up to 50% of kraft paper) may be substituted for part or all of the dry roughage, green roughage or silage in the fodder of ruminant animals, without adversely affecting the gain of weight, digestion or general well being of the animals. I have also found that such substitution of waste newsprint for the dry or green roughage or silage in the fodder of dairy cattle has no adverse effect on the yield of milk or on the butterfat content of said milk.

The waste newsprint, as above indicated, may be cut, shredded, ground or pulped, and may be admixed with molasses, as well as with other components of animal fodders, such as protein cake, urea, ammoniated molasses, ammoniated beet pulp, salt, mineral mixtures, feed supplements of any nature whatever, antibiotics, vitamins, hormones, estrogenic substances, etc. It may be compressed or tabletted in cakes, blocks, tablets, rods, discs, etc., with or without the addition of binding agents such as casein or other proteins, glues, waxes, resins, starches, fats, etc.

What I claim and desire to protect by Letters Patent is:

1. A feeding stuff for ruminant animals containing waste newsprint together with other components of said feed.

2. A feeding stuff for ruminant animals containing waste newsprint mixed with a minor amount of kraft paper together with other components of said feed.

3. A feeding stuff for ruminant animals containing waste newsprint and rendered palatable by admixture with a carbohydrate material.

References Cited in the file of this patent

UNITED STATES PATENTS 2,472,663    Kleine et al. _____ June 7, 1949

OTHER REFERENCES

C. A. 37 (1943) 2841 [8].